Patented May 14, 1929.

1,713,172

UNITED STATES PATENT OFFICE.

ROBERT DE LUCE, OF LOS ANGELES, CALIFORNIA.

PROCESS FOR THE MANUFACTURE OF HYDRAULIC CEMENT.

No Drawing. Application filed January 11, 1927. Serial No. 160,524.

As is well known, or generally believed, the principal constituent of Portland cement is a chemical combination of lime, silica and alumina in certain proportions. It is theoretically possible, but not practical, to make Portland cement by heating a mixture of pure lime, silica, and alumina to a sufficiently high temperature. Portland cement ordinarily is made by clinkering mixtures of materials such as limestone with clay and silica or feldspar containing the three principal ingredients, lime, silica, and alumina, in proper proportions accompanied by other materials such as compounds of iron and magnesia. Many mineral deposits are encountered, the chemical compositions of which indicate that they should be suitable for use in the manufacture of Portland cement, but which are not suitable for commercial use due to the high temperature required for clinkering.

An object of the present invention is to devise a commercially feasible process of making hydraulic cement capable of making use of such refractory cement-making materials.

The process of the present invention is applicable to the refractory cement-making materials referred to, but is not limited thereto, being applicable generally to all such cement-making materials containing lime, alumina, and silica with or without impurities as are theoretically suitable for use in the production of Portland cement.

In accordance with my invention an excessively high clinkering temperature for bringing about the necessary combination of the lime, alumina, and silica is avoided by first subjecting the raw cement-making materials to a preliminary treatment whereby the lime, silica, and alumina are chemically combined or brought into a condition in which they readily combine at temperatures not substantially exceeding those ordinarily employed in clinkering Portland cement mixtures.

The first step of the process of my present invention is similar to the process disclosed in my Patent No. 1,345,077, dated June 29, 1920. The process of said patent is designed for the production of fertilizer material and consists generally in subjecting an aqueous mixture of burned limestone or lime and feldspar or similar potash bearing mineral to vigorous agitation with live or superheated steam at a high temperature, above 100° C. and preferably from 200 to 250° C. and under high pressure, say 200 pounds steam pressure. This treatment preferably is carried out by conducting the aqueous mixture into a closed steel autoclave having a cone bottom into which live steam is admitted. The treatment ordinarily requires from two to six hours. As a result the potash bearing rock is decomposed and the alkali metals rendered soluble as hydroxides, while the lime, silica, and alumina apparently combine forming an insoluble calcium aluminium silicate.

In accordance with the present invention, the principal object of which is the production of hydraulic cement rather than fertilizer material the raw materials are mixed in proper proportions to give a lime-alumina-silica ratio within the range required for the production of Portland cement. This ratio is well known, but for convenience may be stated here as being in the neighborhood of $CaO$ _____ 62.0 parts by weight
$Al_2O_3$ _____ 7.5 parts by weight
$SiO_2$ _____ 22.0 parts by weight or 2.8 parts of lime to each part of silica and 1.1 parts of lime to each part of alumina.

As stated, the first step of the process which is carried out substantially as is described in my Patent No. 1,345,077 referred to, may be applied to mixtures of lime and feldspar or to other suitable mixtures providing the desired ratio of lime, alumina and silica, such as mixtures of burned lime, sand and clay. Regardless of the starting material employed the product of the preliminary treatment is separated by filtration, sedimentation or in any other suitable way, and the liquid, in case feldspar or other material containing soluble valuable components has been used, may be treated for their recovery, such treatment being no part of my present invention. The insoluble portion, which, if the starting materials have been properly proportioned, will consist essentially of lime, silica, and alumina in chemical combination in the proportions necessary for the formation of Portland cement and will be free or substantially free of deleterious materials such as the alkalies. This material is dried and calcined at a temperature of approximately 2300 to 2500° F. As has been indicated the most important advantage of my invention resides in the calcining operation. The temperature required, 2300° F., is below the average clinkering temperature for Portland cement and consequently the ordinary clinkering apparatus may be used even though the original starting materials may have been such that they could not be made into cement without the use of excessively high temperatures with incident disadvantages, such as high fuel consumption and rapid destruction of the clinkering apparatus. In accordance with my invention the mixture or chemical combination of lime, alumina, and silica need be heated only up to the point at which incipient fusion first becomes apparent and it is not necessary to completely vitrify as in the ordinary Portland cement making process. Consequently the temperature required is lower and the time required is shorter than in standard cement making practice. Due to the fact that the material is not clinkered or vitrified as in the usual cement making process, but only slightly fused, the product of the heating operation is quite soft and easily ground as compared with ordinary cement clinker. Also due to the fact that fusion is not required the use of raw material containing iron compounds serving as a flux may be dispensed with and the resulting cement may therefore be white.

As is apparent when feldspar or similar potash containing material is used to supply the silica and alumina ingredients of the cement, the potash is recovered as a valuable by-product.

I claim:

1. Process for the production of hydraulic cement which comprises digesting an aqueous mixture comprising lime, silica, and alumina in proportions suitable for the production of Portland cement at a temperature of at least 100° C. under superatmospheric pressure and with violent agitation until the lime, silica, and alumina are combined as an insoluble calcium aluminium silicate, and heating said insoluble calcium aluminium silicate to the point at which fusion first becomes apparent.

2. Process for the production of hydraulic cement which comprises heating the insoluble residue of the digestion under vigorous agitation with live steam at superatmospheric pressure of a mixture comprising lime, alumina, and silica in substantially the proportions of 2.8 parts by weight of lime to 1 part by weight of silica and 1.1 parts by weight of lime to 1 part by weight of alumina to a temperature of about 2300° F. to 2500° F. until fusion first becomes apparent.

3. Process for the production of hydraulic cement which comprises subjecting a mixture of lime with minerals containing alumina and silica in proportions to produce Portland cement to vigorous agitation with live steam at a temperature of 200 to 250° C., and under a pressure of at least 200 pounds per square inch, separating and drying the insoluble residue, heating the dried residue to a temperature of about 2300° F. until fusion first becomes apparent, and pulverizing the resulting material.

In testimony whereof, I affix my signature.

ROBERT DE LUCE.